Aug. 20, 1929.  W. J. PEARMAIN  1,725,016
CLUTCH
Filed June 3, 1927    4 Sheets-Sheet 1

Witness
Martin H. Olsen

Inventor
William J. Pearmain
By Rector Hibben Davis (illegible)
Attys.

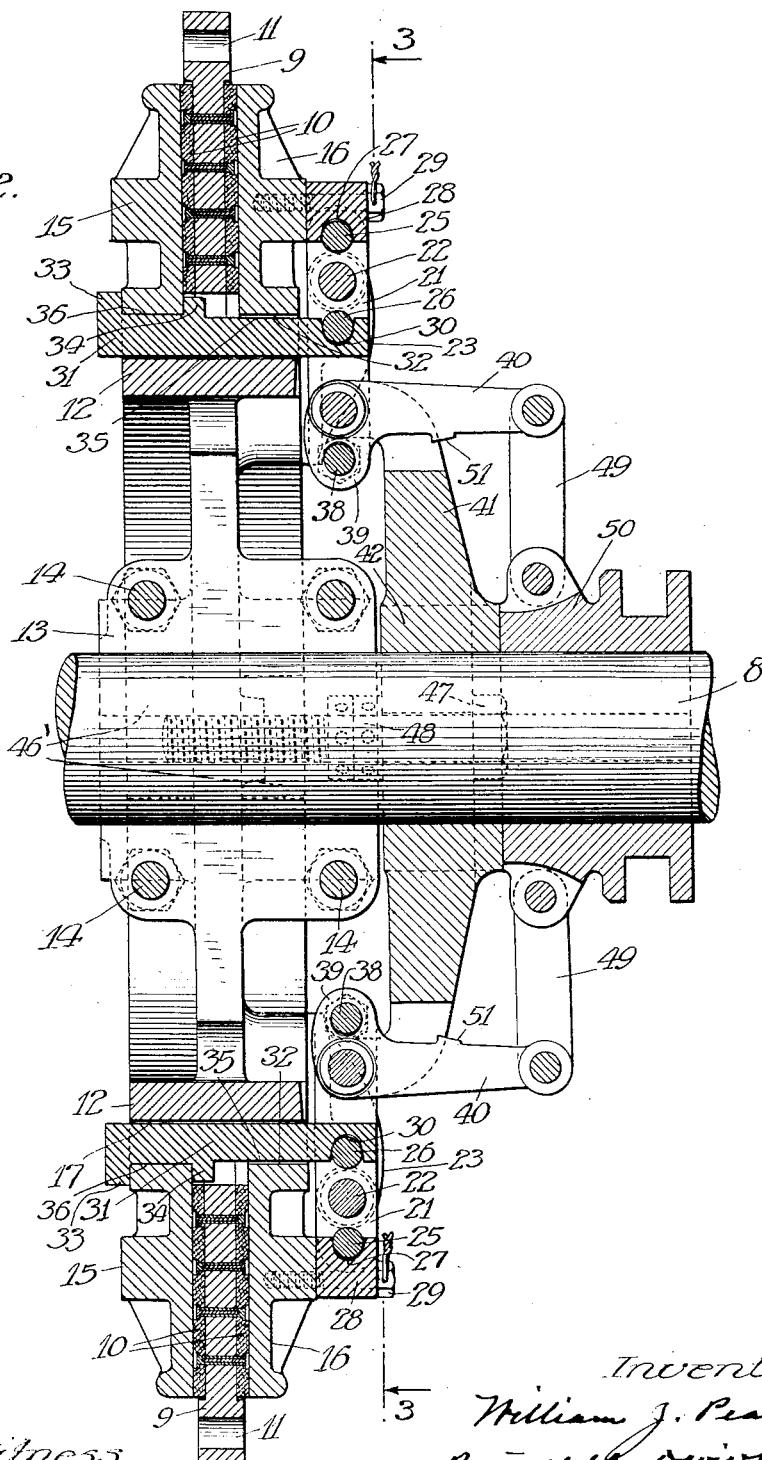

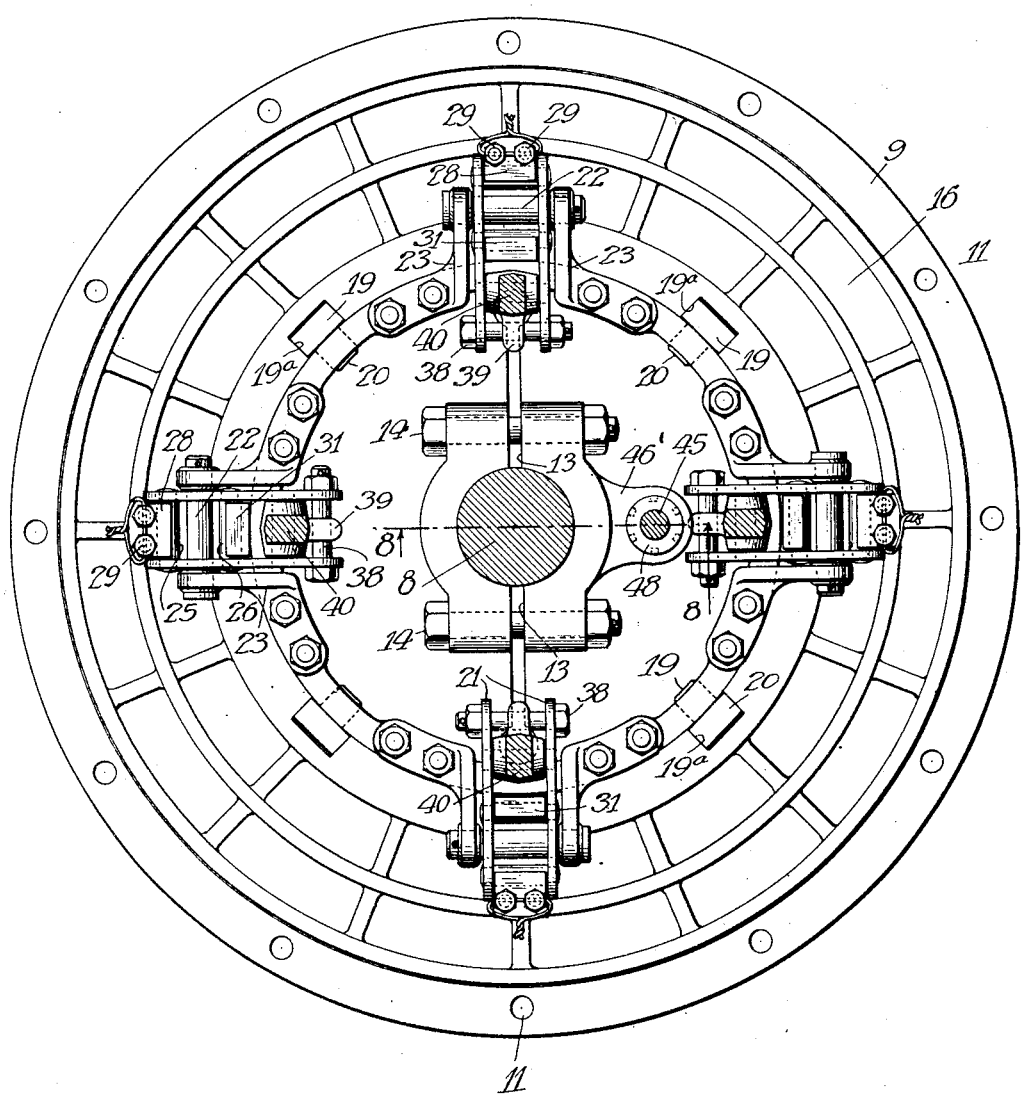

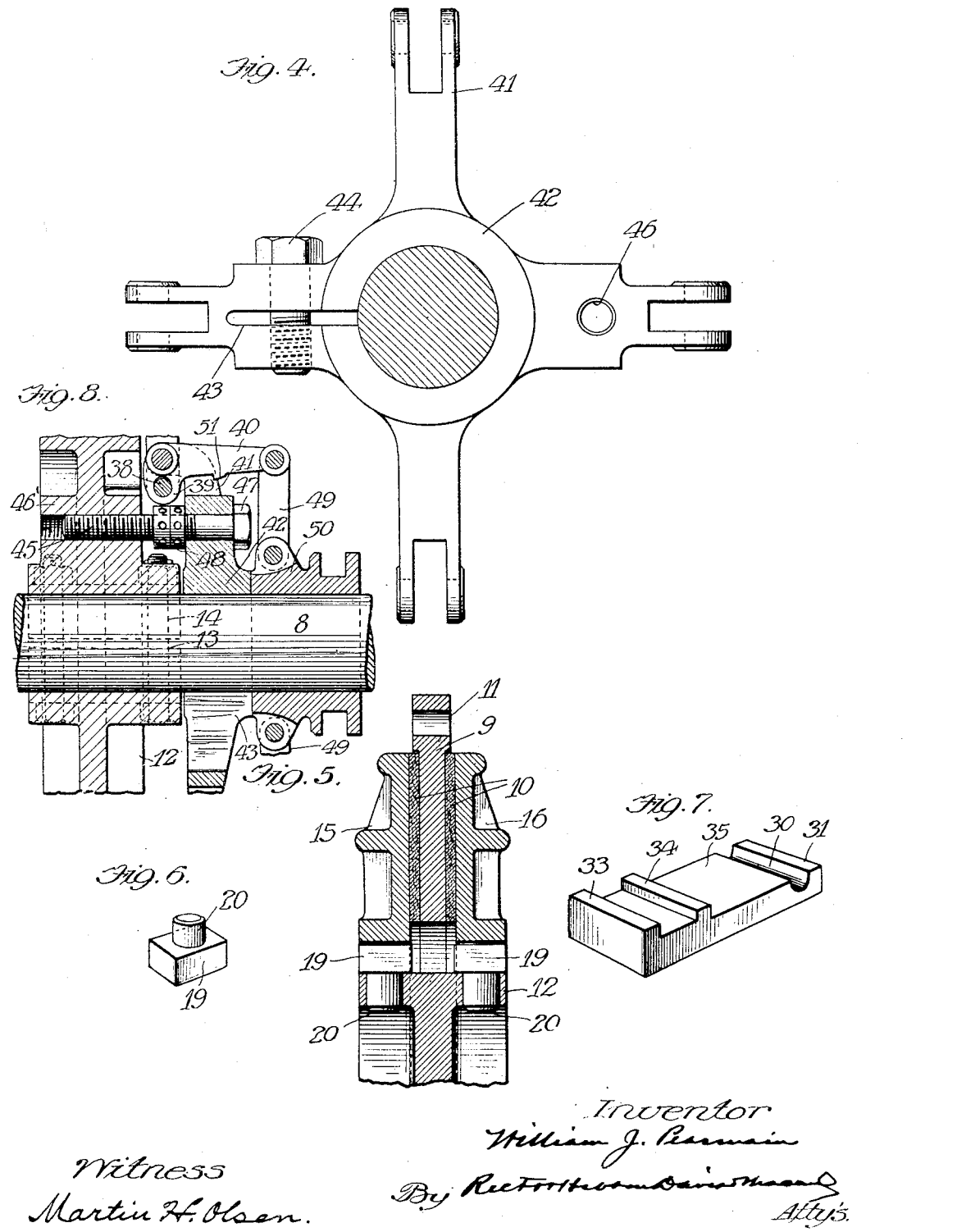

Patented Aug. 20, 1929.

1,725,016

UNITED STATES PATENT OFFICE.

WILLIAM J. PEARMAIN, OF RACINE, WISCONSIN, ASSIGNOR TO THE TWIN DISC CLUTCH COMPANY, OF RACINE, WISCONSIN.

CLUTCH.

Application filed June 3, 1927. Serial No. 196,163.

My invention more specifically relates to a clutch of the plate or disk type and provides a device of this character in which a pair of clamping members rotatable with a shaft engage an intermediate friction plate on another rotary element to be at will rotated with or independently of the rotation of the shaft, in which the clamping members are positively actuated into and out of contact with the friction plate. My invention further provides in a structure of this character a simple and convenient means for adjustment to take up wear and permit of the use of clutch plates of different diameter without modification of the other parts of the clutch. Other features and advantages will appear from the following description and claims.

In the drawings accompanying and forming a part of this specification,

Fig. 2 is a diametric section of the same on the plane of the line 2—2 of Fig. 1, parts being shown in elevation;

Fig. 3 is a transverse section through the shaft and clutch on the plane of line 3—3 of Fig. 2;

Fig. 4 is an elevation of one of the principal elements of the clutch, the shaft to which it is applied being shown in section;

Fig. 5 is a partial diametric section on the plane of line 5—5 of Fig. 1;

Figs. 6 and 7 are perspective views of details, and

Fig. 8 is a section on line 8—8 of Fig. 3.

In the following description and in the accompanying drawings, each element is identified by the same reference character wherever it occurs.

Figure 1:
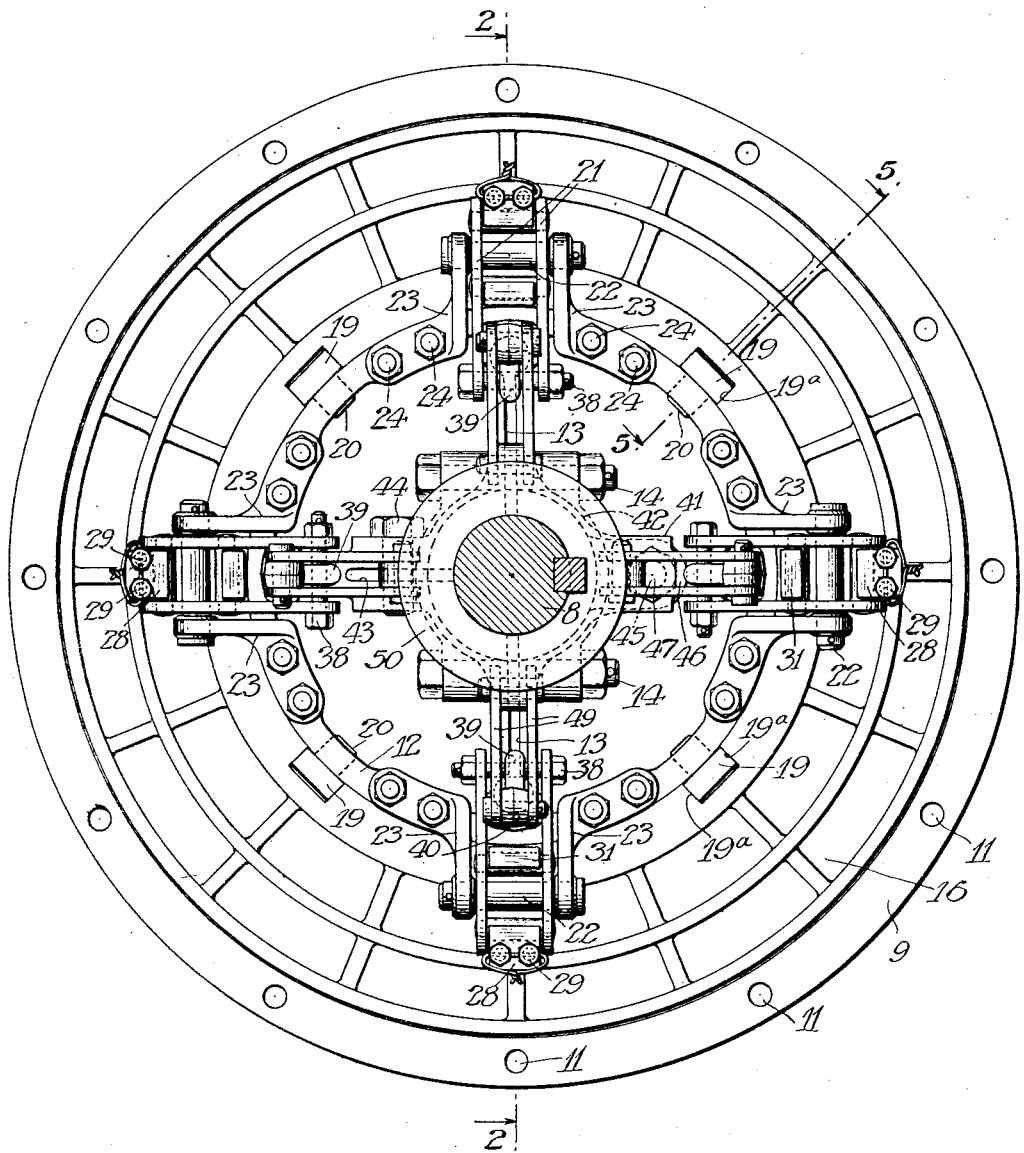
Figure 1 is an elevation of a clutch embodying my invention as applied to a shaft shown in transverse section.

In the following description the shaft 8 will be referred to as the driven member and the friction plate 9 as attached to the driving element but it will be obvious that this relationship may be reversed. The friction plate 9 is shown as of usual construction, provided with facings 10 of friction material secured thereto, and drilled at 11 for bolting fixedly to a fly wheel or other source of power. A hub 12 is keyed upon the shaft 8 for rotation therewith. The sleeve 13 of the hub may be slit, as shown, and clamped tightly to the shaft 8 by bolts 14, it being desirable that the hub have neither rotary or axial movement with respect to the shaft.

Clamping disks 15—16 are located on opposite sides of the intermediate friction plate 9 and both said clamping disks have an axial movement with respect to the hub upon which they fit and slide. Provision is made for positively actuating the clamping disks in opposite directions so that they may be made simultaneously to approach and recede from the friction plate without movement either of said friction plate or of the hub. The periphery 17 of the hub is smooth and cylindrical and the inner peripheries of the clamping disks closely fit said hub but with sufficient clearance to permit the desired axial movement. The clamping disks are, however, keyed to the hub for rotation therewith by means of one or more rectangular keys 19 extending across the periphery of the hub and anchored thereto by dowels 20, (see Figs. 1, 5 and 6); said key or keys fit snugly in transverse grooves 32 of which there are eight formed in each clamping disk.

In order to positively engage and disengage the clamping disks from the intermediate friction plate, I provide a plurality of pairs of levers 21 (referred to hereinafter as primary levers), evenly spaced with respect thereto, four pairs of levers being shown in this instance, the levers of each pair being connected together to act as one. Each pair of levers, the members of which are suitably spaced apart, is pivoted on a fulcrumed pin 22, mounted in a pair of brackets 23 bolted at 24 to the edge of the rim of the hub. The outer ends of the levers of each pair are connected by a cross-pin 25, and a similar cross-pin 26 connects the levers on the other side of their fulcrum pin and at about the same distance therefrom. Each outer pin 25 engages a seat or bearing 27 carried by the clamping disk 16. Preferably the seat or bearing is formed in a pressure block 28 which is bolted to clamping disk 16 at 29. Each inner cross-pin 26 engages a seat or bearing 30 formed in an axially movable key 31 which rests against the periphery of the hub, extends through registering keyways 32 above mentioned in the disks 15 and 16 and is provided with lugs or ribs 33—34 engaging respectively the opposite faces of the clamping disk 15. Preferably, the sliding keys 31 are of slightly less width than the keyways, so that they receive none of the driving strain and are of less cross-section at 35 where they extend through the near clamping disk at 36 than where they engage the far clamping disk and by so forming the keys the clamping disks may be reversible, that is to say, the same disk may be applied to either side of the intermediate friction plate. It will be evident from the foregoing that by swinging the levers 21 the clamping disks may be released from or engaged with the intermediate friction plate.

The inner ends of the levers of each pair are connected by a cross-bolt 38. This cross-bolt engages a seat or recess 39 formed in the shorter end of a bell crank lever 40 (referred to hereinafter as a secondary lever), there being four of these bell crank levers each mounted in a fulcrum arm 41, of which there are four, formed integral with a collar 42 axially adjustable upon the shaft 8. Normally, however, this collar 42 is tightly clamped upon the shaft 8 being split at 43 and provided with a clamping screw 44 for this purpose (see Fig. 4). Provision is made for axially adjusting this collar on the shaft to take up wear, and for this purpose a bolt 45 extends through a hole 46 in one of the arms of the collar and is tapped into a boss or enlargement 46' formed on the sleeve of the hub, (see Figs. 3, 4 and 8). Relative longitudinal movement of the bolt with respect to the collar is prevented but rotative movement allowed by nut 47 and lock nuts 48, 48'.

The longer arms of the bell crank levers 40 are connected by links 49 with the sliding sleeve 50, which sleeve may be of the ordinary form used for such purposes and actuated by the usual fork. Preferably the construction is such that when the sleeve is in the innermost position, as shown in Fig. 2, in which position the clutch is engaged, the links are slightly beyond dead center so that there is no tendency of the clutch to release itself. The inward movement of the bell crank levers 40 may be limited by stops 51 seating against the bottoms of the crotches in which said levers are pivoted.

The operation of the clutch will be readily understood from the foregoing description in connection with the drawings. When it is desired to release the clutch from the engaged position in which it is shown in Fig. 2, the sleeve 50 is moved away, which causes the longer arms of the bell cranks to move inward toward the shaft and the bell cranks in turn throw the inner ends of levers 21 to the left (as seen in Fig. 2). The levers 21, through pins 25, draw the clamping disk 16 away from the friction plate and through pins 26 and keys 31 force the clamping disk 15 away from the friction plate. The reverse movement of the shifting sleeve engages the clutch.

In using my improved clutch the friction plate may be firmly anchored to the driving element and the hub to the driven shaft since both of the clamping disks move away from the friction plate without relative movement between the hub and friction plate. The action is even and positive in both directions, thus dispensing with springs. A simple and satisfactory adjustment for wear is also provided. The clamping disks may be exact duplicates and may be reversed or interchanged and if larger engaging surfaces are desired it is a mere matter of exchanging the friction plate and clamping disks, the other parts remaining the same. The employment of springs is entirely avoided.

I claim:

1. In a clutch of the class described, a hub adapted to be mounted on a shaft, a friction plate adapted for connection to a rotary element coaxial with said shaft, floating clamping disks on opposite sides of said friction plate and movable axially on the hub, means for causing the clamping disks to rotate with the hub, levers pivotally supported by the hub, and pivotally connected at their outer ends to the adjacent clamping disk, sliding keys engaging the other clamping disk, extending through the friction plate and first-mentioned clamping disk and pivotal connections between said levers and keys, and means for swinging said levers.

2. In a clutch of the class described, a hub adapted to be mounted on a shaft, a friction plate adapted for connection to a rotary element coaxial with the shaft, clamping disks on opposite sides of the friction plate, means for causing the clamping disks to rotate with the hub but permitting axial movement with respect thereto, levers pivotally supported on the hub, pivot pins in the outer ends of said levers, seats carried by the adjacent clamping disk with which said pins engage, keys extending through said clamping disks and friction plate and engaging the clamping disk remote from said levers, there being seats formed in said keys adjacent the respective levers, pivot pins on said levers engaging said seats, a shifting sleeve adapted to slide upon said shaft, and connections between said shifting sleeve and levers for operating the latter.

3. In a clutch of the class described, a hub adapted to be mounted on a shaft, a friction plate adapted for connection to a rotary element coaxial with the shaft, clamping disks on opposite sides of the friction plate, said disks being keyed to the hub for rotation therewith and axial movement relative thereto, levers pivotally mounted on the hub and connected at opposite sides of their fulcra to the respective clamping disks, secondary levers connected to the first mentioned levers for operating the same, a collar on which said secondary levers are pivotally mounted, means for adjusting said collar, a shifting sleeve adapted to be mounted on said shaft, and connections from said shifting sleeve to the secondary levers for operating the latter.

4. In a clutch of the class described, a hub having a cylindrical outer periphery adapted to be mounted on a shaft, a friction plate adapted for connection to a rotary element coaxial with the shaft, clamping disks on opposite sides of the friction plate, means for causing the clamping disks to rotate with the hub but permitting axial movement with respect thereto, levers radially arranged about the hub, pivotally mounted thereon, and connected on opposite sides of their respective pivots with the respective clamping disks, a collar adapted for axial adjustment on said shaft, a screw bolt extending through said collar and passing through the hub for adjusting said collar relative to said hub, bell crank levers fulcrumed on said collar, pivotal connections between the inner ends of the first mentioned levers and the shorter arms of said bell crank levers, a shifting sleeve for mounting on said shaft and links connecting said sleeve and the longer arms of said bell crank levers.

5. In a clutch of the class described, a hub having a cylindrical outer periphery adapted to be mounted on a shaft, a friction plate adapted for connection to a rotary element coaxial with the shaft, clamping disks on opposite sides of the friction plate, embracing the hub and axially slidable thereon, said clamping disks having formed in their inner peripheries corresponding transverse grooves, keys mounted on the hub and occupying some of said transverse grooves in the respective clamping disks, to prevent relative rotary motion between said clamping disks and the hub, sliding keys occupying other of said grooves, connected to one of said disks to actuate the same and extending through the other of said disks, levers radially arranged and engaging said sliding keys and the last mentioned clamping disk to move said disks in opposite directions and means for operating said levers.

In testimony whereof, I have subscribed my name.

WILLIAM J. PEARMAIN.